US009623913B2

United States Patent
Yamamoto

(10) Patent No.: US 9,623,913 B2
(45) Date of Patent: Apr. 18, 2017

(54) COWL STRUCTURE

(71) Applicant: TOYOTA JIDOSHA KABUSHIKI KAISHA, Toyota-shi, Aichi-ken (JP)

(72) Inventor: Yohei Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/150,881

(22) Filed: May 10, 2016

(65) Prior Publication Data

US 2016/0339962 A1 Nov. 24, 2016

(30) Foreign Application Priority Data

May 18, 2015 (JP) .................. 2015-101392

(51) Int. Cl.
*B62D 25/00* (2006.01)
*B62D 25/08* (2006.01)
*B62D 25/24* (2006.01)

(52) U.S. Cl.
CPC ........... *B62D 25/081* (2013.01); *B62D 25/24* (2013.01)

(58) Field of Classification Search
CPC .............................. B62D 25/081; B62D 25/24
USPC ............................................. 296/192, 96.21
See application file for complete search history.

(56) References Cited

U.S. PATENT DOCUMENTS

| 7,000,979 | B2 | 2/2006 | Borkowski et al. |
| 7,976,097 | B2 | 7/2011 | Watanabe et al. |
| 8,567,851 | B2 * | 10/2013 | Morden ............... B62D 25/081 296/192 |
| 8,882,182 | B2 | 11/2014 | Murofushi et al. |
| 2009/0146459 | A1 * | 6/2009 | Watanabe ............... B60H 1/28 296/192 |

FOREIGN PATENT DOCUMENTS

JP 2012086606 A 5/2012

* cited by examiner

*Primary Examiner* — Joseph D Pape
(74) *Attorney, Agent, or Firm* — Oliff PLC

(57) ABSTRACT

A cowl structure includes a cowl main body and a gutter extension. The cowl main body runs along a lower edge of a windshield, and has (i) a gutter open toward a vehicle upper side, (ii) an inlet port through a rear wall portion for drawing outside air into a vehicle cabin, and (iii) a glass support that supports a lower end of the windshield. The gutter extension (a) extends forwardly and downwardly from a front end of the glass support (b) has a length in the vehicle width direction, (c) is concave toward the vehicle upper side, (d) is located in a range of the vehicle width direction that includes a range of the inlet port, and (e) includes a water drainage outlet that causes water received by the gutter extension to fall from a position offset in the vehicle width direction with respect to the inlet port.

11 Claims, 4 Drawing Sheets

COWL STRUCTURE

CROSS-REFERENCE TO RELATED APPLICATION

This application is based on and claims priority under 35 USC 119 from Japanese Patent Application No. 2015-101392 filed on May 18, 2015, the entire disclosure of which is incorporated by reference herein.

BACKGROUND

Technical Field

The disclosure relates to a cowl structure.

Related Art

As an example of a protector for a cowl louver, FIG. 4 of Japanese Patent Application Laid-Open (JP-A) No. 2012-86606 illustrates technology related to a protector that includes a rain gutter located further to a vehicle rear side than a rear edge portion of a cowl louver. The protector of this related art includes a location into which a rear edge portion of the cowl louver is fitted, and a location into which a lower edge of a windshield is inserted; and the above-described rain gutter juts out to the vehicle rear side and is disposed at the lower side of the windshield. In such technology, provided that, for example, the rain gutter is set at a position capable of receiving water that has been channeled along a sealing portion between a back face of the windshield and the cowl (not illustrated in FIG. 4 of JP-A No. 2012-86606), and that the rain gutter is set such that water is made to fall from a position offset in the vehicle width direction with respect to a vehicle width direction forming range of an inlet port set at the lower side of a lower end portion of the windshield, the water can be prevented or suppressed from entering the inlet port.

However, in the related art described above, the protector must be attached to the cowl louver and set with the rain gutter, and in cases in which there is a long distance from a rear edge portion of the cowl louver to the sealing portion between the back face of the windshield and the cowl, the protector must jut out by a large amount toward the vehicle rear side. In the case of the related art described above, if, for example, water that has reached a length direction (vehicle width direction) end of the rain gutter travels around to the lower face side of the rain gutter due to surface tension, there is a possibility of the water falling from a vehicle width direction position corresponding to the vehicle width direction forming range of the inlet port.

In consideration of the above circumstances, an object of the embodiments is to provide, with a simple structure, a cowl structure capable of preventing or effectively suppressing intrusion of water into an inlet port set at the lower side of a lower end portion of a windshield.

SUMMARY

A cowl structure according to a first aspect includes a cowl main body and a gutter extension section. The cowl main body has a length in a vehicle width direction configured to run along a lower edge of a windshield, and includes (i) a gutter that is open toward a vehicle upper side, (ii) an inlet port through a rear wall portion of the cowl main body for drawing outside air into a vehicle cabin, and (iii) a glass support portion configured to support, through a seal, a lower end portion of the windshield from a vehicle lower side of the windshield. The gutter extension section (a) that extends forwardly and downwardly from a front end portion of the glass support portion, (b) has a length in the vehicle width direction, (c) is concave toward the vehicle upper side, (d) is located in a range of the vehicle width direction that includes a vehicle width direction range of the inlet port, and (e) includes a water drainage outlet configured to cause water received by the gutter extension section to fall from a position offset in the vehicle width direction with respect to the vehicle width direction forming range of the inlet port.

In the above configuration, the lower end portion of the windshield is supported from the vehicle lower side by the glass support portion of the cowl main body through the seal, and the inlet port is formed through the rear wall portion of the cowl main body. If water is channeled along the seal between the lower end portion of the windshield and the glass support portion of the cowl main body, there is accordingly a possibility of this water attempting to flow toward the lower side at a vehicle width direction position corresponding to the vehicle width direction forming range of the inlet port.

In the embodiments, the gutter extension section is provided and extends forwardly and downwardly from a front end portion of the glass support portion. The gutter extension section has its length direction in the vehicle width direction, is concave toward the vehicle upper side, and is located in a range of the vehicle width direction that includes the vehicle width direction forming range of the inlet port. Even supposing that water that had been channeled along the seal were then to flow toward the lower side at a vehicle width direction position corresponding to the vehicle width direction forming range of the inlet port, this water would thereby flow toward the outside of the vehicle width direction range corresponding to the vehicle width direction forming range of the inlet port due to the water flowing to the gutter extension section and flowing along the length direction of the gutter extension section. The water would then fall from a position offset in the vehicle width direction with respect to the vehicle width direction forming range of the inlet port due to the water drainage outlet.

A cowl structure according to a second aspect includes the first aspect, wherein the water drainage outlet includes two opposite ends of the gutter extension section in the vehicle width direction, each of the two opposite ends being inclined toward a vehicle lower side.

In the above configuration, the inclined portion for draining water, inclined toward the vehicle lower side on progression toward the length direction ends of the gutter extension section and serving as the water drainage outlet, is set at both length direction end portions of the bottom portion of the gutter extension section. Thus, in cases in which water that has flowed into the gutter extension section flows along the length direction of the gutter extension section, the flow speed of the water increases when the water reaches the length direction end portion of the gutter extension section. Accordingly, the water that has reached the length direction ends of the gutter extension section can be prevented from trickling around to the lower face side of the gutter extension section due to the surface tension by using a simple structure, even if the amount of water that has flowed into the gutter extension section is small. The water that has flowed into the gutter extension section can accordingly be made to stably fall from the length direction ends of the gutter extension section.

As explained above, the cowl structure of the embodiments has the excellent advantageous effect of being capable of, with a simple structure, preventing or effectively suppressing intrusion of water into the inlet port set at the lower side of the lower end portion of the windshield.

BRIEF DESCRIPTION OF THE DRAWINGS

Exemplary embodiments will be described in detail based on the following figures, wherein.

DETAILED DESCRIPTION

Figure 1:
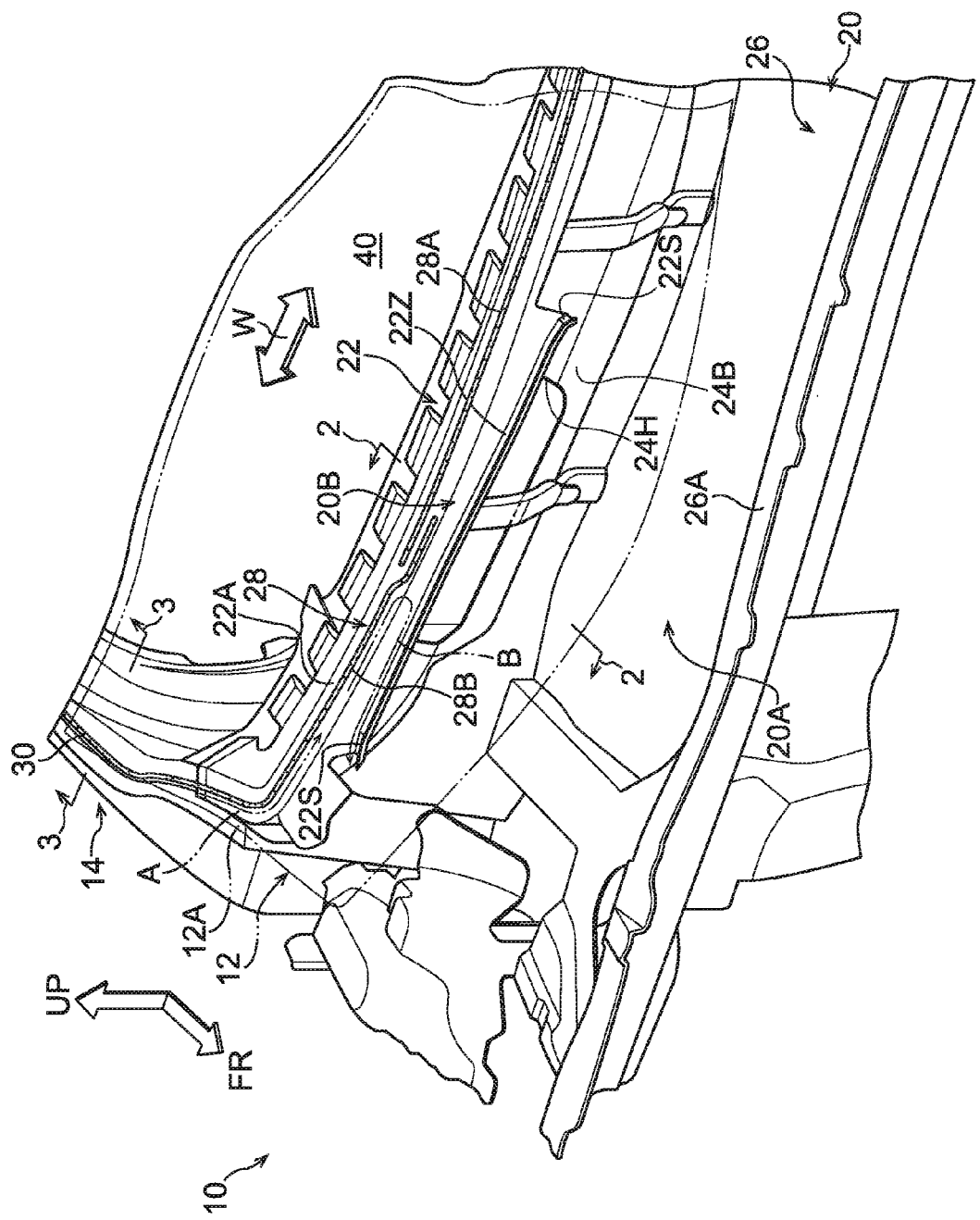
FIG. 1 is a perspective view illustrating a cowl structure and the periphery thereof according to an exemplary embodiment, in which the outer profile of a windshield is illustrated by double-dotted intermittent lines.

Explanation follows regarding a cowl structure according to an exemplary embodiment, with reference to FIG. 1 to FIG. 4. Note that in the drawings, the arrow FR indicates the vehicle front side, the arrow UP indicates the vehicle upper side, and the arrow W indicates the vehicle width direction, as appropriate. Hereafter, unless specifically stated otherwise, explanation simply referring to the front-rear and up-down directions refers to front-rear in the vehicle front-rear direction, and up-down in the vehicle up-down direction.

Figure 2:
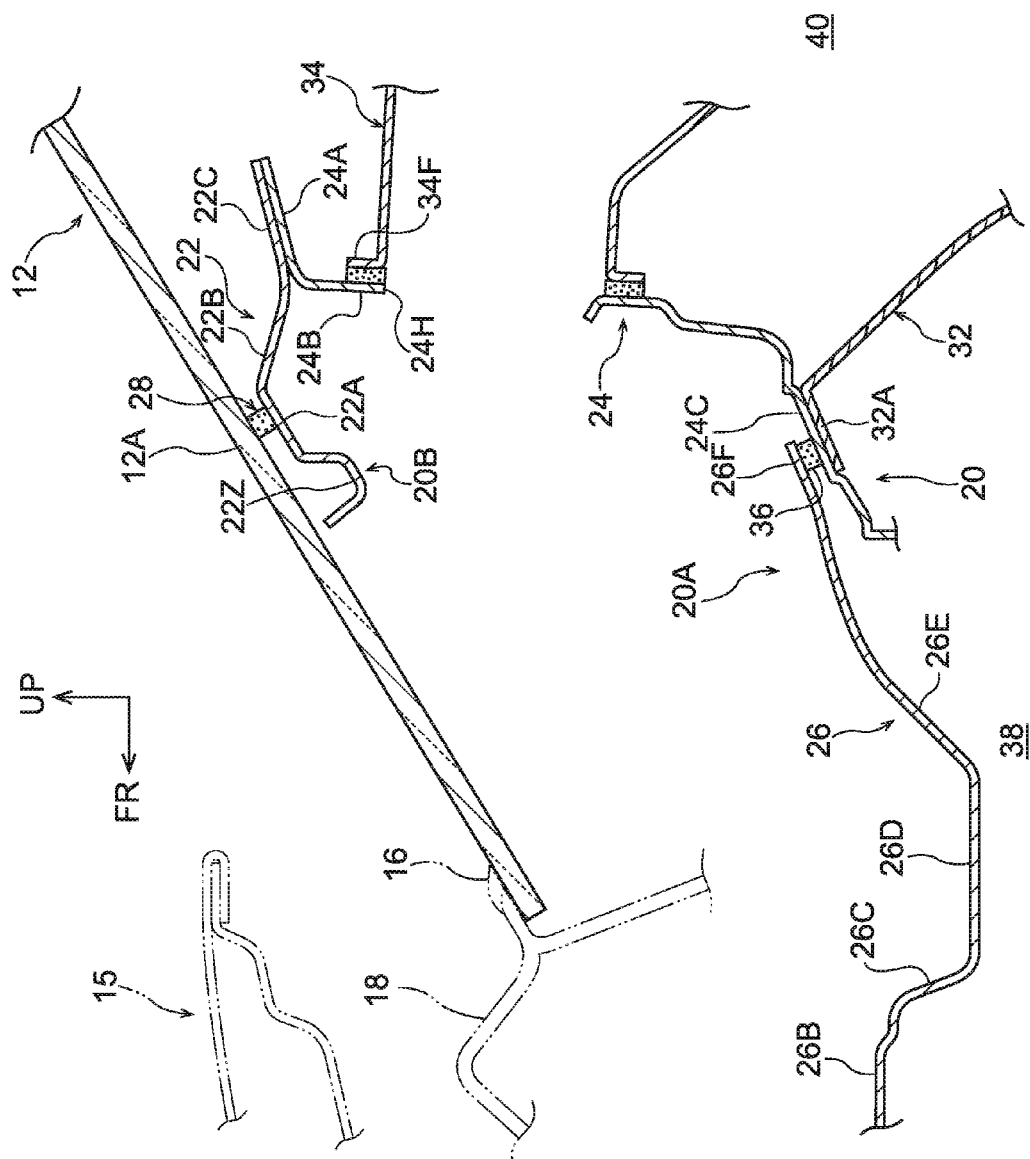
FIG. 2 is an enlarged vertical cross-section along line 2-2 in FIG. 1.

FIG. 1 is a perspective view illustrating a portion of a vehicle 10 (automobile) to which a cowl structure according to the present exemplary embodiment is applied, as viewed obliquely from the vehicle upper front. Note that in FIG. 1, the outer profile of a windshield (front windshield glass) 12 is illustrated by double-dotted intermittent lines, and a hood, a cowl louver, wiper arms, and the like, are omitted from illustration. FIG. 2 is an enlarged vertical cross-section along line 2-2 in FIG. 1.

As illustrated in FIG. 2, a cowl louver 18 made of resin and a cowl 20 made of sheet metal are disposed adjacent to a lower end portion 12A of the windshield 12. The cowl louver 18 and the cowl 20 are disposed along the lower edge of the windshield 12, with their length direction running in the vehicle width direction. The cowl louver 18 is disposed at the vehicle upper side of (above) a location at the vehicle front side of the cowl 20, and is penetrated by plural small openings, not illustrated in the drawings. The cowl louver 18 is adjacent to the vehicle lower side of (below) a rear end portion of a hood 15. A sealing member 16 made of rubber is fitted to a vehicle rear side end portion of the cowl louver 18. The sealing member 16 is in press-contact with a front side lower end portion of a glass face of the windshield 12. The cowl 20 links together left and right front pillars 14 (see FIG. 1), has a function of separating water from air attempting to flow inside a vehicle cabin 40, and houses a wiper system (not illustrated in the drawings) within its cross-section.

The cowl 20 includes a cowl main body 20A. The cowl main body 20A is formed in a gutter shape open to the vehicle upper side (that is, the cowl main body 20A is concave facing upward). An inlet port 24H for drawing outside air into the vehicle cabin 40 is formed penetrating a rear wall portion 24B of the cowl main body 20A. The cowl main body 20A is configured including part of a cowl upper panel 22 (a portion excluding a gutter extension section 20B, described later), a cowl inner panel 24, and a cowl lower panel 26. Note that the cowl upper panel 22, cowl inner panel 24, and cowl lower panel 26 are all sheet metal components.

The cowl upper panel 22 is disposed running along a lower face of the lower end portion 12A of the windshield 12 with its length direction in the vehicle width direction. The cowl upper panel 22 includes a glass support portion 22A configuring an attachment face (support face) for the lower end portion 12A of the windshield 12. The glass support portion 22A is disposed parallel to the lower end portion 12A of the windshield 12, and supports the lower end portion 12A of the windshield 12 from the vehicle lower side through a sealing portion 28. As an example, the sealing portion 28 is configured by a urethane-based adhesive, and affixes the windshield 12 and the glass support portion 22A together.

As illustrated in FIG. 1, the sealing portion 28 extends in a line substantially along the length direction of the cowl upper panel 22. Note that FIG. 1 illustrates a first seal portion 28A and a second seal portion 28B that are slightly separated from each other as the sealing portion 28. The first seal portion 28A is set in a line on a vehicle width direction intermediate portion of the glass support portion 22A, and most of the second seal portion 28B is set in a line on an extension line of the first seal portion 28A toward the vehicle width direction outside. End portions of the first seal portion 28A and the second seal portion 28B are disposed side-by-side with a slight interval in the vehicle front-rear direction therebetween. Namely, a vehicle width direction inside end portion of the second seal portion 28B is bent in a crank shape as viewed from the vehicle upper side, and is disposed alongside the first seal portion 28A at the vehicle front side thereof. A vehicle width direction outside location of the sealing portion 28 (second seal portion 28B) is bent obliquely toward the vehicle rear and vehicle width direction outside, and extends toward a side of the front pillar 14. A sealing portion 30 sealing between the front pillar 14 and the windshield 12 is set in a line continuing at the vehicle rear side of the sealing portion 28.

Figure 3:
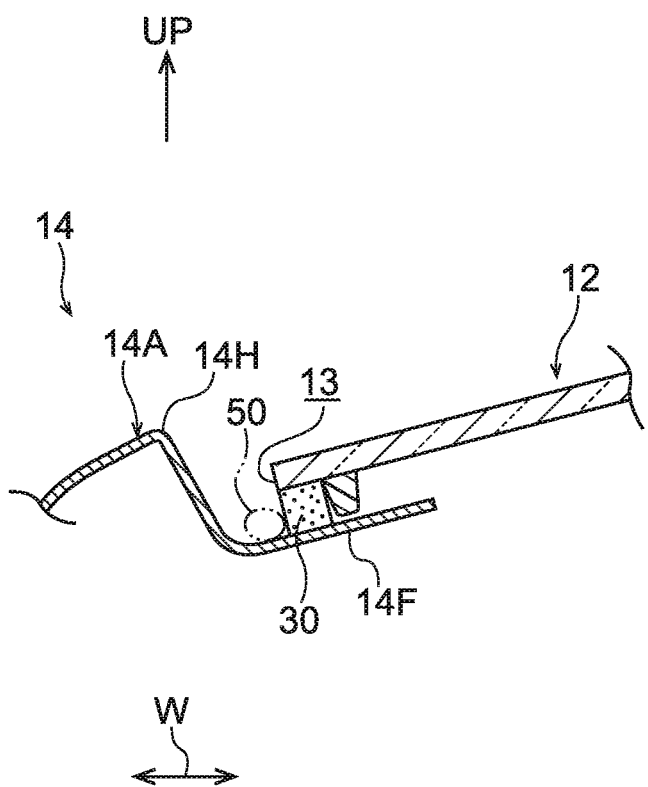
FIG. 3 is an enlarged vertical cross-section along line 3-3 in FIG. 1.

FIG. 3 illustrates an enlarged vertical cross-section along line 3-3 in FIG. 1. As illustrated in FIG. 3, the sealing portion 30 affixes a lower side of a side portion of the windshield 12 to an upper face of an inside flange 14F of a side outer panel 14A configuring the front pillar 14, and as an example, is configured by a urethane-based adhesive. To explain further, the side outer panel 14A includes a pillar outer main body 14H disposed at the vehicle width direction outside of the windshield 12 and bulging out toward the vehicle cabin outside, and the inside flange 14F that extends bent from an end portion on the vehicle width direction inside of the pillar outer main body 14H toward the vehicle width direction inside. A gap 13, into which water 50 is capable of flowing, is formed between the pillar outer main body 14H and a vehicle width direction outside end face of the windshield 12.

As illustrated in FIG. 2, the cowl upper panel 22 includes a rear side wall portion 22B that is extended bent from a rear end portion of the glass support portion 22A obliquely toward the vehicle lower rear side, and also includes a rear end flange 22C that is extended bent from a lower end portion of the rear side wall portion 22B obliquely toward the vehicle upper rear side. A rear end flange 24A of the cowl inner panel 24 is superimposed on a lower face of the rear end flange 22C and is joined thereto by welding such as spot welding. Note that configuration of a front end portion (a location further toward the front side than the glass support portion 22A) of the cowl upper panel 22 is described later.

The cowl inner panel 24 is disposed with its length direction in the vehicle width direction, similarly to the cowl upper panel 22. The cowl inner panel 24 includes the rear wall portion 24B (rear wall portion 24B of the cowl main body 20A) that extends bent from the front end portion of the rear end flange 24A obliquely toward the vehicle lower front side. A flange 34F of an air conditioner duct 34 at the outer periphery portion of the inlet port 24H is fastened to the rear face of the rear wall portion 24B, and a seal is configured between the rear wall portion 24B and the flange 34F. The air conditioner duct 34 configures a portion of an airflow path of an air conditioner (an air conditioning unit that conditions the air inside the vehicle cabin 40), and a blower, not illustrated in the drawings, is disposed inside the airflow path.

The cowl inner panel 24 also includes a bottom wall portion 24C extended bent from a lower end portion of the rear wall portion 24B obliquely toward the vehicle front lower side. A lower face of the bottom wall portion 24C is joined to an upper end portion 32A of a dash panel 32 (vehicle passenger compartment front wall). The cowl inner panel 24 is thereby supported by the dash panel 32. The dash panel 32 partitions between a power unit chamber 38 (for example, engine compartment) and the vehicle passenger compartment (vehicle cabin 40). A rear end portion 26F of the cowl lower panel 26 is affixed to and sealed to an upper face of the bottom wall portion 24C of the cowl inner panel 24 using an adhesive 36.

The cowl lower panel 26 is disposed with its length direction in the vehicle width direction, similarly to the cowl upper panel 22 and the cowl inner panel 24, and a non-illustrated front side lower end portion of the cowl louver 18 is attached to a front end flange 26A (see FIG. 1). The cowl lower panel 26 includes a rear side inclined portion 26E extending bent from a front end of the rear end portion 26F obliquely toward the vehicle lower front side, and also includes a front portion bottom wall portion 26D extending bent from a lower end portion of the rear side inclined portion 26E toward the vehicle front side. The cowl lower panel 26 also includes a front side inclined portion 26C extending bent from a front end portion of the front portion bottom wall portion 26D obliquely toward the vehicle upper front side, and a shelf portion 26B extending bent from an upper end portion of the front side inclined portion 26C toward the vehicle front side.

The cowl 20 includes the gutter extension section 20B (rain gutter) extended from a front end portion of the glass support portion 22A of the cowl main body 20A (cowl upper panel 22) of the upper portion of the cowl 20 toward the vehicle front lower side. As illustrated in FIG. 1 and FIG. 2, the gutter extension section 20B is disposed with its length direction in the vehicle width direction, is formed in a gutter shape open to the vehicle upper side, and is set in a range of the vehicle width direction containing a vehicle width direction forming range of the inlet port 24H. Namely, as illustrated in FIG. 1, a length direction intermediate portion of the gutter extension section 20B is provided within a vehicle width direction range coinciding with the vehicle width direction forming range of the inlet port 24H, and both length direction ends (outlets) of the gutter extension section 20B are provided at positions outside of the vehicle width direction forming range of the inlet port 24H in the vehicle width direction. In the present exemplary embodiment, the length direction central portion of the gutter extension section 20B is set at the vehicle front lower side of a portion where the end portions of the first seal portion 28A and the second seal portion 28B are side-by-side in the vehicle front-rear direction.

Figure 4:
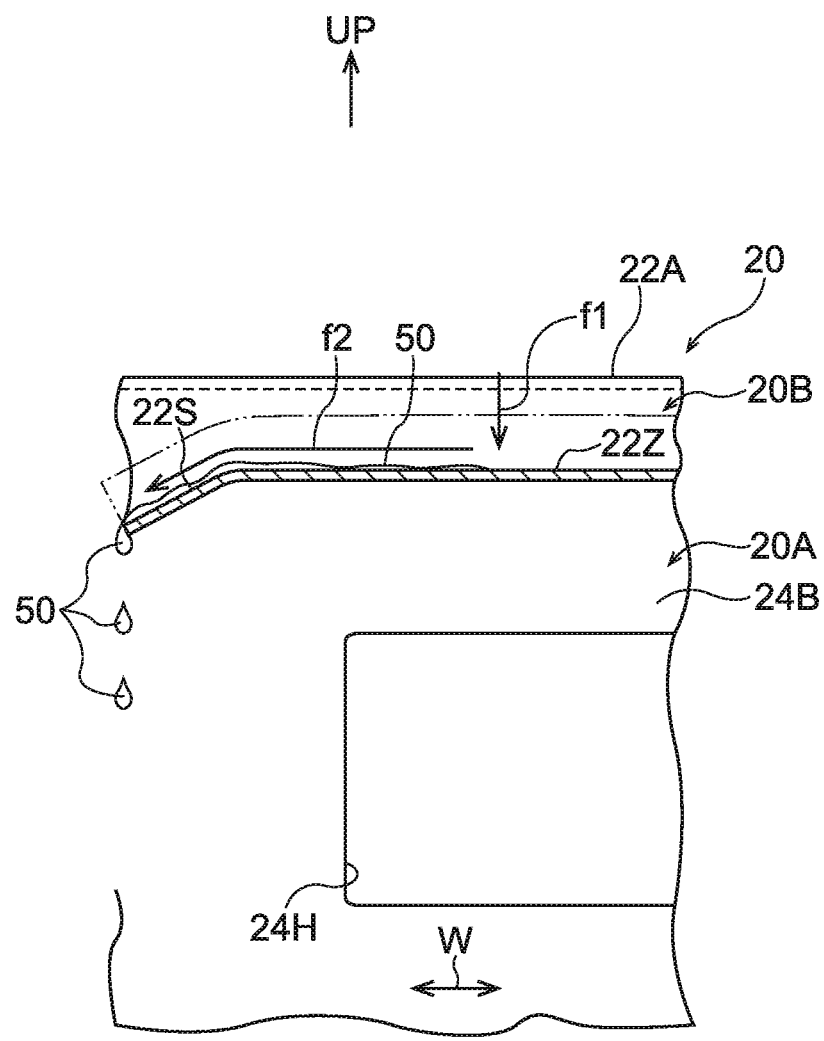
FIG. 4 is vertical cross-section schematically illustrating a state in which water that has flowed along a gutter extension section illustrated in FIG. 1 falls from a length direction end of the gutter extension section, in which a front wall portion of the gutter extension section is illustrated by double-dotted intermittent lines.

An inclined portion 22S for draining water, inclined toward the vehicle lower side on progression toward the length direction end of the gutter extension section 20B and serving as a water drainage structure configured to cause water received by the gutter extension section 20B to fall from a position offset in the vehicle width direction with respect to the vehicle width direction forming range of the inlet port 24H, is set at each of the length direction end portions of a bottom portion 22Z of the gutter extension section 20B (see FIG. 4).

Operation and Advantageous Effects of Exemplary Embodiment

Next, explanation follows regarding operation and advantageous effects of the exemplary embodiment described above.

As illustrated in FIG. 2, the lower end portion 12A of the windshield 12 is supported from the vehicle lower side by the glass support portion 22A of the cowl main body 20A through the sealing portion 28, and the inlet port 24H is formed penetrating the rear wall portion 24B of the cowl main body 20A. Thus, for example, when water that has been channeled along the sealing portion 30 between the side portion of the windshield 12 illustrated in FIG. 1 and the front pillar 14 trickles around to the back face side of the windshield 12 due to surface tension, and is channeled along the sealing portion 28 between the lower end portion 12A of the windshield 12 and the glass support portion 22A of the cowl main body 20A (see arrow A), there is a possibility of this water attempting to flow toward the lower side at a vehicle width direction position corresponding to the vehicle width direction forming range of the inlet port 24H.

Note that in the present exemplary embodiment, the gutter extension section 20B is formed extended from a front end portion of the glass support portion 22A toward the vehicle front lower side, and the gutter extension section 20B is disposed with its length direction in the vehicle width direction, is formed in a gutter shape open to the vehicle upper side, and is set in a range of the vehicle width direction containing the vehicle width direction forming range of the inlet port 24H. Even supposing that water that had been channeled along the sealing portion 28 were then to flow toward the lower side at a vehicle width direction position corresponding to the vehicle width direction forming range of the inlet port 24H, this water would thereby flow toward the outside of the vehicle width direction range corresponding to the vehicle width direction forming range of the inlet port 24H (as an example, see arrow B) due to the water flowing into the gutter extension section 20B and flowing along the length direction of the gutter extension section 20B.

The inclined portions 22S for draining water, inclined toward the vehicle lower side on progression toward the length direction ends of the gutter extension section 20B and serving as a water drainage structure configured to cause water received by the gutter extension section 20B to fall from positions offset in the vehicle width direction with respect to the vehicle width direction forming range of the inlet port 24H, are set at both length direction end portions of the bottom portion 22Z of the gutter extension section 20B. In cases in which water 50 that has flowed into the gutter extension section 20B illustrated in FIG. 4 (in the arrow f1 direction) has flowed along the length direction of the gutter extension section 20B (see the arrow f2), the flow speed of the water 50 increases when the water 50 reaches a length direction end portion of the gutter extension section 20B. Accordingly, the water 50 that has reached the length direction terminal of the gutter extension section 20B can be prevented from trickling around to the lower face side of the gutter extension section 20B due to the surface tension by using a simple structure, even if the amount of water 50 that has flowed into the gutter extension section 20B is small. The water 50 that has flowed into the gutter extension section 20B can be made to stably fall downward from the length direction end of the gutter extension section 20B, namely, can be made to stably fall from a position offset in the vehicle width direction with respect to the vehicle width direction forming range of the inlet port 24H.

As explained above, according to the cowl structure of the present exemplary embodiment, intrusion of water to the inlet port 24H (and consequently the air conditioner duct 34 or the air conditioner blower (not illustrated in the drawings)) set at the lower side of the lower end portion 12A of the windshield 12 illustrated in FIG. 2 and so on, can be prevented or effectively suppressed with a simple structure.

In a comparative structure in which a protector with a rain gutter is attached to a cowl louver, for example, component costs and welding costs increase; however, the cowl structure of the present exemplary embodiment is capable of suppressing such costs, and is also a superior structure to the comparative structure from the perspective of weight.

Supplementary Explanation of Present Exemplary Embodiment

In the exemplary embodiment described above, the inclined portions 22S for draining water illustrated in FIG. 4 and so on serve as water drainage structures; however, other water drainage structures may be applied as water drainage structures, such as a water drainage rib (or protrusion) hanging down toward the vehicle lower side (in the direction of gravity) from a length direction end of the bottom portion of the gutter extension section, or a water drainage structure including a water drainage hole penetrating the bottom portion of the gutter extension section and a water drainage tube portion hanging down toward the vehicle lower side (in the direction of gravity) from an outer peripheral side of the water drainage holes.

Combinations of the exemplary embodiment and modified examples described above may be implemented as appropriate.

The described examples are not limiting. Various other modifications may be implemented.

What is claimed is:

1. A cowl structure comprising:
   a cowl main body that has a length in a vehicle width direction configured to run along a lower edge of a windshield, the cowl main body including (i) a gutter that is open toward a vehicle upper side, (ii) an inlet port through a rear wall portion of the cowl main body for drawing outside air into a vehicle cabin, and (iii) a glass support portion configured to support, through a seal, a lower end portion of the windshield from a vehicle lower side of the windshield; and
   a gutter extension section that (a) extends forwardly and downwardly from a front end portion of the glass support portion, (b) has a length in the vehicle width direction, (c) is concave toward the vehicle upper side, (d) is located in a range of the vehicle width direction that includes a vehicle width direction range of the inlet port, and (e) includes a water drainage outlet configured to cause water received by the gutter extension section to fall from a position offset in the vehicle width direction with respect to the vehicle width direction range of the inlet port.

2. The cowl structure of claim 1, wherein the water drainage outlet includes two opposite ends of the gutter extension section in the vehicle width direction, each of the two opposite ends being inclined toward the vehicle lower side.

3. A cowl structure to be disposed along a lower edge of a windshield of a vehicle having a vehicle cabin, the cowl structure comprising:
   a cowl main body having a length extending in a vehicle width direction, the cowl main body including (1) a rear wall extending upwardly in a vehicle height direction, the rear wall having an inlet port through which outside air is drawn into the vehicle cabin, and (2) a glass support portion located above the inlet port and configured to support, through a seal, a lower end portion of the windshield from a vehicle lower side of the windshield; and
   a gutter extension section that (a) extends forwardly and downwardly relative to a front end portion of the glass support portion, (b) is concave toward a vehicle upper side, (c) is co-extensive with the inlet port in the vehicle width direction, and (d) includes a water drainage outlet configured to cause water received by the gutter extension section to fall from a position offset in the vehicle width direction with respect to an end, in the vehicle width direction, of the inlet port.

4. The cowl structure of claim 3, wherein the gutter extension section has a length in the vehicle width direction that is larger than a length of the inlet port in the vehicle width direction.

5. The cowl structure of claim 3, wherein the water drainage outlet includes two opposite ends of the gutter extension section in the vehicle width direction, each of the two opposite ends being inclined toward the vehicle lower side.

6. The cowl structure of claim 3, wherein the cowl main body includes a gutter that is open toward the vehicle upper side, the gutter being disposed below the rear wall and the glass support portion of the cowl main body, and below the gutter extension section.

7. The cowl structure of claim 6, wherein the rear wall of the cowl main body extends upward in the vehicle height direction from a rear portion of the gutter.

8. The cowl structure of claim 1, wherein the length of the gutter extension section in the vehicle width direction is less than the length of the cowl main body in the vehicle width direction so that the water drainage outlet of the gutter extension section is located between an outermost edge of the inlet port in the vehicle width direction and an outermost edge of the cowl main body in the vehicle width direction, and so that the water that falls from the water drainage outlet lands on the gutter of the cowl main body.

9. The cowl structure of claim 2, wherein the length of the gutter extension section in the vehicle width direction is less than the length of the cowl main body in the vehicle width direction so that the two opposite ends of the gutter extension section are located between outermost edges of the inlet port in the vehicle width direction and outermost edges of the cowl main body in the vehicle width direction, and so that the water that falls from the water drainage outlet lands on the gutter of the cowl main body.

10. The cowl structure of claim 3, wherein a length of the gutter extension section in the vehicle width direction is less than the length of the cowl main body in the vehicle width direction so that the water drainage outlet of the gutter extension section is located between the end of the inlet port in the vehicle width direction and an outermost edge of the cowl main body in the vehicle width direction.

11. The cowl structure of claim 5, wherein a length of the gutter extension section in the vehicle width direction is less than the length of the cowl main body in the vehicle width direction so that the two opposite ends of the gutter extension section are located between outermost ends of the inlet port in the vehicle width direction and outermost edges of the cowl main body in the vehicle width direction.

\* \* \* \* \*